(12) United States Patent
Sakurada et al.

(10) Patent No.: US 11,176,826 B2
(45) Date of Patent: Nov. 16, 2021

(54) INFORMATION PROVIDING SYSTEM, SERVER, ONBOARD DEVICE, STORAGE MEDIUM, AND INFORMATION PROVIDING METHOD

(71) Applicant: TOYOTA JIDOSHA KABUSHIKI KAISHA, Toyota (JP)

(72) Inventors: Shin Sakurada, Toyota (JP); Jun Okamoto, Nagoya (JP); Josuke Yamane, Nissin (JP); Risako Yamamoto, Toyota (JP); Kazuki Sugie, Toyota (JP); Masatoshi Komiyama, Handa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/680,759

(22) Filed: Nov. 12, 2019

(65) Prior Publication Data

US 2020/0175872 A1 Jun. 4, 2020

(30) Foreign Application Priority Data

Nov. 29, 2018 (JP) .............................. JP2018-224094

(51) Int. Cl.
*H04N 5/225* (2006.01)
*B60R 1/00* (2006.01)
*G08G 1/16* (2006.01)

(52) U.S. Cl.
CPC .............. *G08G 1/162* (2013.01); *B60R 1/00* (2013.01); *G08G 1/166* (2013.01);
(Continued)

(58) Field of Classification Search
CPC ........ G08G 1/162; G08G 1/166; G08G 1/164; G08G 1/127; G08G 1/133; G08G 1/0175;
(Continued)

(56) References Cited

U.S. PATENT DOCUMENTS 5,635,922 A * 6/1997 Cho .................. G01S 17/931
340/903
7,333,012 B1 * 2/2008 Nguyen ................ B60R 25/04
340/426.1
(Continued)

FOREIGN PATENT DOCUMENTS

JP 2016-057490 A 4/2016

*Primary Examiner* — Tung T Vo
(74) *Attorney, Agent, or Firm* — Oblon, McClelland, Maier & Neustadt, L.L.P.

(57) ABSTRACT

An information providing system includes a server and an onboard device configured to transmit and receive information to and from the server. The onboard device includes an imaging unit configured to image a nearby vehicle and a first transmission unit configured to transmit nearby vehicle information including a captured image of the nearby vehicle or dangerous vehicle information including a position of a dangerous vehicle which is detected from the nearby vehicle information and position information of the onboard device to the server. The server includes a warning unit configured to generate warning information including the position of the dangerous vehicle for a vehicle near the dangerous vehicle and a second transmission unit configured to transmit the warning information.

15 Claims, 8 Drawing Sheets

(52) U.S. Cl.
CPC ...... *H04N 5/2253* (2013.01); *B60R 2300/105* (2013.01); *B60R 2300/804* (2013.01); *B60R 2300/8066* (2013.01); *B60R 2300/8093* (2013.01)

(58) Field of Classification Search
CPC ...... G08G 1/0112; G08G 1/0141; G08G 1/00; G08G 1/16; B60R 1/00; B60R 2300/105; B60R 2300/804; B60R 2300/8066; B60R 2300/8093; H04N 5/2253; H04N 7/18
USPC ........................................................ 348/148
See application file for complete search history.

(56) References Cited

U.S. PATENT DOCUMENTS

| | | | | |
|---|---|---|---|---|
| 10,286,905 | B2* | 5/2019 | Lee | G05D 1/0223 |
| 10,431,089 | B1* | 10/2019 | Nguyen | B60Q 9/00 |
| 2005/0060117 | A1* | 3/2005 | Kunzler | G01S 13/931 |
| | | | | 702/149 |
| 2005/0203705 | A1* | 9/2005 | Izumi | B62D 6/002 |
| | | | | 701/301 |
| 2008/0192984 | A1* | 8/2008 | Higuchi | G08G 1/166 |
| | | | | 382/104 |
| 2013/0147955 | A1* | 6/2013 | Oosugi | G08G 1/164 |
| | | | | 348/148 |
| 2014/0188366 | A1* | 7/2014 | Shin | G08G 1/166 |
| | | | | 701/96 |
| 2015/0344038 | A1* | 12/2015 | Stenneth | G07C 5/0816 |
| | | | | 340/439 |
| 2017/0036673 | A1* | 2/2017 | Lee | B60W 30/09 |
| 2017/0186320 | A1* | 6/2017 | Lai | G08G 1/012 |
| 2018/0257647 | A1* | 9/2018 | Jurca | B60W 30/095 |
| 2018/0297590 | A1* | 10/2018 | Kang | G08G 1/16 |
| 2019/0111835 | A1* | 4/2019 | Remberg Bueno | B60Q 1/525 |
| 2019/0168777 | A1* | 6/2019 | Lester | B60W 50/14 |
| 2020/0066146 | A1* | 2/2020 | Ichikawa | G06K 9/00771 |
| 2020/0079368 | A1* | 3/2020 | Yamada | G05D 1/0055 |

* cited by examiner

INFORMATION PROVIDING SYSTEM, SERVER, ONBOARD DEVICE, STORAGE MEDIUM, AND INFORMATION PROVIDING METHOD

INCORPORATION BY REFERENCE

The disclosure of Japanese Patent Application No. 2018-224094 filed on Nov. 29, 2018 including the specification, drawings and abstract is incorporated herein by reference in its entirety.

BACKGROUND

1. Technical Field

The present disclosure relates to an information providing system, a server, an onboard device, a storage medium, and an information providing method.

2. Description of Related Art

A method of supporting driving of a vehicle has been proposed. For example, Japanese Patent Application Publication No. 2016-057490 (JP 2016-057490 A) discloses a driving support system that captures an image of the surroundings of a vehicle, displays the image of the surroundings of the vehicle to a driver as an instruction image when dangerous circumstances are detected, and causes the driver to recognize a dangerous operation in driving of the driver.

SUMMARY

The technique disclosed in JP 2016-057490 A causes a driver to recognize a dangerous driving operation of the driver later and promotes improvement of a driving technique. However, for example, even when an appropriate driving operation is performed, danger may occur due to behavior of another vehicle. In this case, there is a demand for a method of effectively detecting nearby dangerous circumstances.

Therefore, the present disclosure provides an information providing system or the like that can detect danger due to behavior of a nearby vehicle early and secure safety.

According to a first aspect of the present disclosure, there is provided an information providing system including a server and an onboard device configured to transmit and receive information to and from the server. The onboard device includes an imaging unit configured to image a nearby vehicle and a first transmission unit configured to transmit nearby vehicle information or dangerous vehicle information including a position of a dangerous vehicle which is detected from the nearby vehicle information and position information of the onboard device to the server. The server includes a warning unit configured to generate warning information including the position of the dangerous vehicle for a vehicle near the dangerous vehicle and a second transmission unit configured to transmit the warning information.

According to a second aspect of the present disclosure, there is provided an onboard device including: a reception unit configured to receive the above-mentioned warning information; and an output unit configured to output the warning information. The warning information may include a warning message including a type of dangerous behavior.

According to a third aspect of the present disclosure, there is provided a server including: a reception unit configured to receive nearby vehicle information including a captured image of a nearby vehicle which is captured by an onboard device and position information of the onboard device; a dangerous vehicle detecting unit configured to detect dangerous vehicle information of a dangerous vehicle from the nearby vehicle information; a warning unit configured to generate warning information including a position of the dangerous vehicle for a vehicle near the dangerous vehicle; and a transmission unit configured to transmit the warning information.

According to a fourth aspect of the present disclosure, there is provided a server including: a reception unit configured to receive dangerous vehicle information of a dangerous vehicle which is detected from nearby vehicle information including a captured image of a nearby vehicle which is captured by an onboard device and position information of the onboard device; a warning unit configured to generate warning information including a position of the dangerous vehicle for a vehicle near the dangerous vehicle; and a transmission unit configured to transmit the warning information.

According to a fifth aspect of the present disclosure, there is provided an onboard device including: a reception unit configured to receive the warning information from the above-mentioned server; and an output unit configured to output the warning information. The warning information may include a warning message including a type of dangerous behavior.

According to a sixth aspect of the present disclosure, there is provided an onboard device including: an imaging unit configured to image a nearby vehicle; a dangerous vehicle detecting unit configured to detect dangerous vehicle information of a dangerous vehicle from the nearby vehicle information including a captured image of the nearby vehicle which is captured by the imaging unit; and a transmission unit configured to transmit the dangerous vehicle information and position information of the onboard device to a server.

According to a seventh aspect of the present disclosure, there is provided a non-transitory computer-readable storage medium, the storage medium being configured to store a computer program causing a computer to perform: receiving nearby vehicle information including a captured image of a nearby vehicle which is captured by an onboard device and position information of the onboard device; detecting dangerous vehicle information of a dangerous vehicle from the nearby vehicle information; generating warning information including a position of the dangerous vehicle for a vehicle near the dangerous vehicle; and transmitting the warning information.

According to an eighth aspect of the present disclosure, there is provided a non-transitory computer-readable storage medium, the storage medium being configured to store a computer program causing a computer to perform: receiving dangerous vehicle information of a dangerous vehicle which is detected from nearby vehicle information including a captured image of a nearby vehicle which is captured by an onboard device and position information of the onboard device; generating warning information including a position of the dangerous vehicle for a vehicle near the dangerous vehicle; and transmitting the warning information.

According to a ninth aspect of the present disclosure, there is provided an information providing method including: causing an onboard device, which is configured to transmit and receive information to and from a server, to transmit nearby vehicle information acquired by imaging a nearby vehicle or dangerous vehicle information including a position of a dangerous vehicle which is detected from the nearby vehicle information and position information of the onboard device to the server; causing the server to generate warning information including the position of the dangerous vehicle for a vehicle near the dangerous vehicle exhibiting dangerous behavior detected from the nearby vehicle information; and causing the server to transmit the warning information.

With the information providing system or the like according to the present disclosure, it is possible to detect danger due to behavior of a nearby vehicle early and to contribute to securement of safety.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, an embodiment of the present disclosure will be described with reference to the accompanying drawings.

Figure 1:
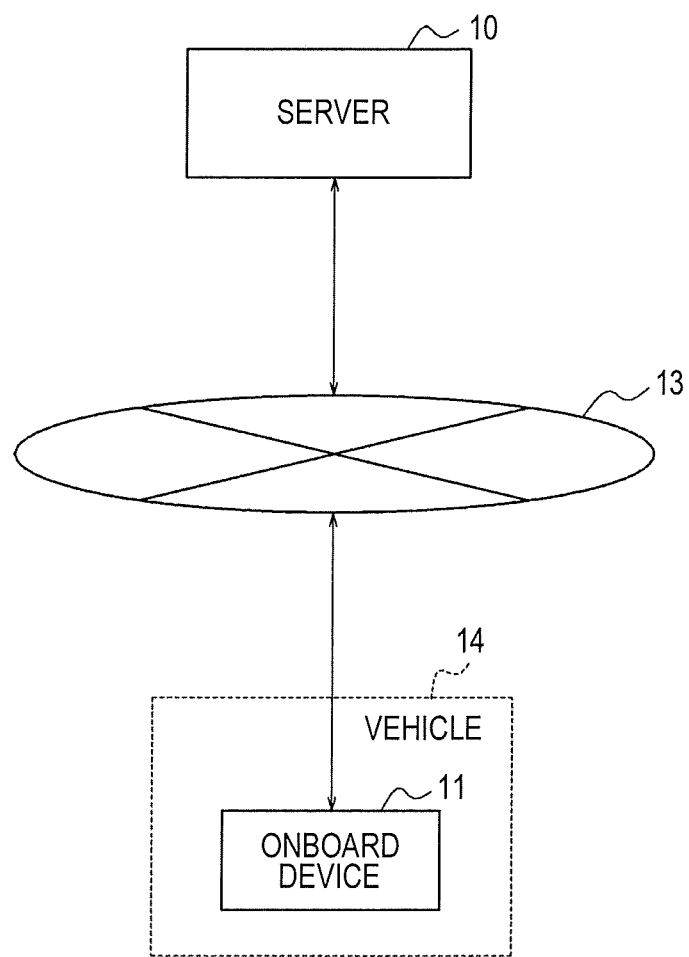
FIG. 1 is a diagram illustrating a configuration of an information providing system.

FIG. 1 illustrates a configuration of an information providing system 1 according to an embodiment. An information providing system 1 includes a server 10 and an onboard device 11 which is mounted in a vehicle 14. The vehicle 14 is, for example, an automobile but is not limited thereto and may be an arbitrary vehicle which a user can board. The onboard device 11 has one or both of a navigation function and an imaging function. The server 10 and the onboard device 11 are connected to transmit and receive data to and from each other via a network 13 in a wired or wireless manner. The information providing system 1 may include a plurality of onboard devices 11 which are mounted in a plurality of vehicles 14. In this configuration, the server 10 and the onboard devices 11 transmit and receive a variety of information to and from each other.

When a vehicle 14 is traveling, the onboard device 11 images nearby vehicles near the vehicle 14, for example, in imaging areas in front of, beside, or behind the vehicle 14. Then, the onboard device 11 transmits its position information and nearby vehicle information to the server 10. When a dangerous vehicle exhibiting dangerous behavior is detected from the nearby vehicle information of the vehicle 14, the server 10 generates warning information for the vehicle 14 near the dangerous vehicle. Then, the server 10 transmits the warning information. A driver of the vehicle 14 having received the warning information can detect that a dangerous vehicle is in the vicinity thereof early even when the host vehicle cannot image the dangerous vehicle directly. In this way, according to this embodiment, it is possible to contribute to securement of safety in driving.

Figure 2:
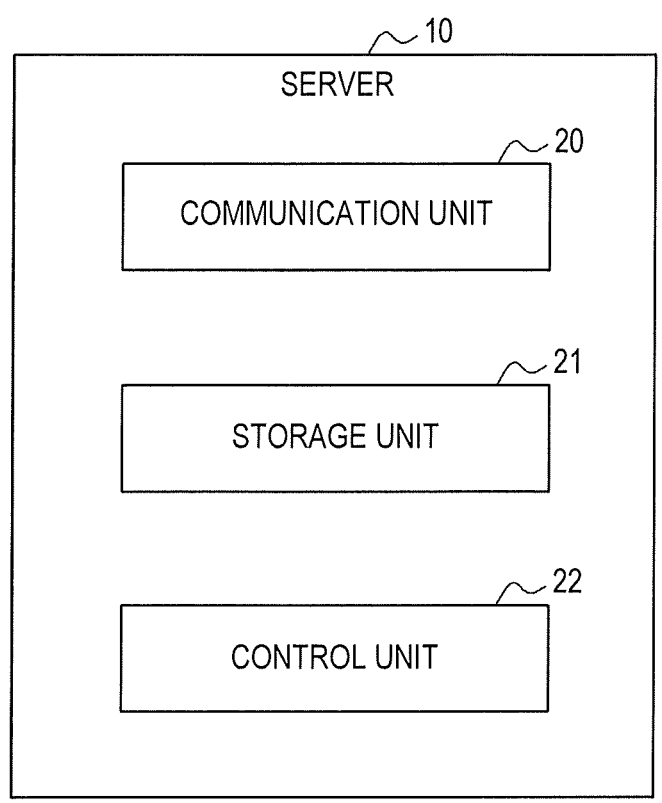
FIG. 2 is a diagram illustrating a configuration of a server.

FIG. 2 illustrates the configuration of the server 10. The server 10 includes a communication unit 20, a storage unit 21, and a control unit 22. The server 10 is a single computer or a plurality of computers that can communicate with each other.

The communication unit 20 includes one or more communication modules that are connected to the network 13. For example, the communication unit 20 may include a communication module corresponding to a wired local area network (LAN) standard. In this embodiment, the server 10 is connected to the network 13 via the communication unit 20.

The storage unit 21 includes one or more memories. Each memory included in the storage unit 21 may function as, for example, a main storage device, an auxiliary storage device, or a cache storage device. The storage unit 21 stores arbitrary information, control processing programs, and databases which are used for operation of the server 10.

The control unit 22 includes one or more processors. Each processor is a general-purpose processor or a dedicated processor specialized in a specific process, but is not limited thereto. The control unit 22 controls the operation of the server 10 in accordance with a control processing program which is stored in the storage unit 21. The control unit 22 also has a clocking function of acquiring a current time.

Figure 3:
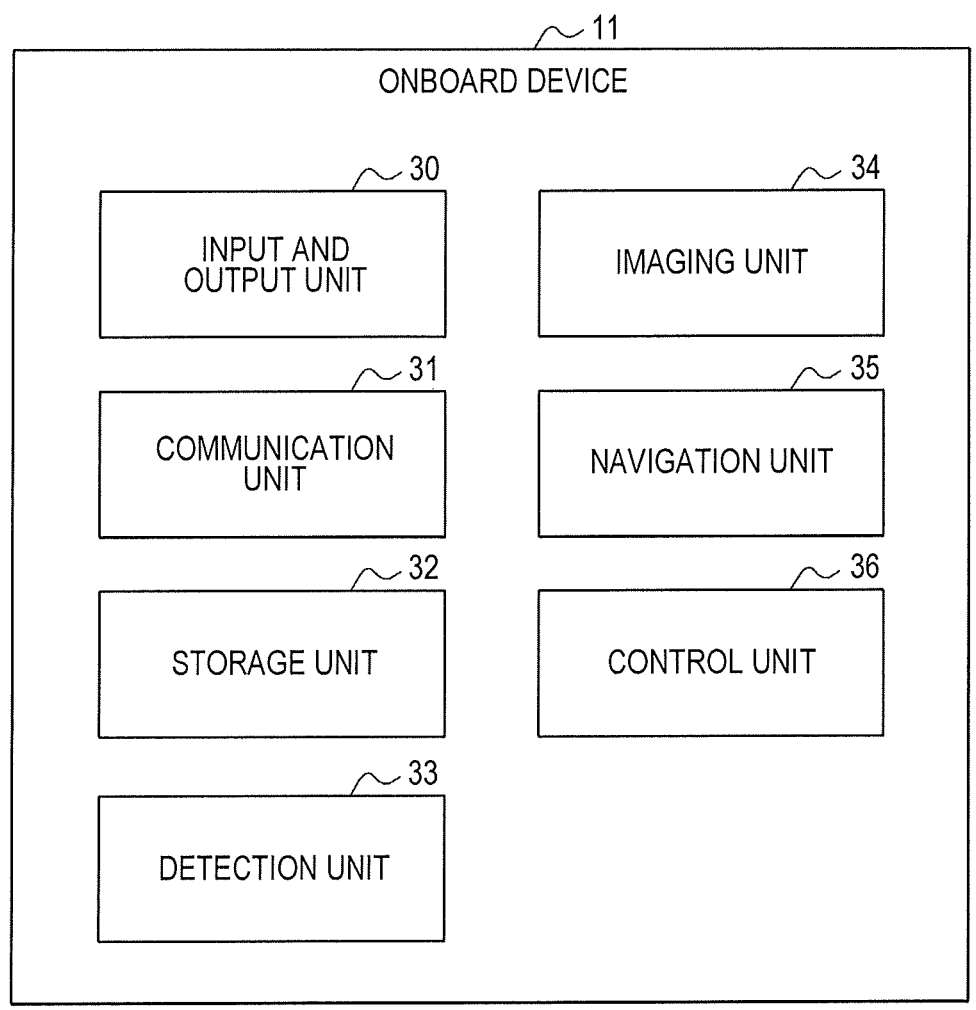
FIG. 3 is a diagram illustrating a configuration of an onboard device.

FIG. 3 illustrates the configuration of the onboard device 11. The onboard device 11 includes an input and output unit 30, a communication unit 31, a storage unit 32, a detection unit 33, an imaging unit 34, a navigation unit 35, and a control unit 36. The onboard device 11 may be a single device or may be constituted by a plurality of devices.

The input and output unit 30 includes an input interface that detects a user's input and supplies input information to the navigation unit 35, the control unit 36, and the like. The input interface includes, for example, physical keys, capacitive keys, a touch screen that is provided integrally with a panel display, or a microphone that receives a sound input, but is not limited thereto and may be an arbitrary input interface. The input and output unit 30 includes an output interface that outputs information, which is generated by the navigation unit 35 or the control unit 36 or acquired from the server 10, to a user. The output interface includes, for example, a panel display that outputs information as a still image or a moving image, a head-up display, or a speaker that outputs information as sound, but is not limited thereto and may be an arbitrary output interface.

The communication unit 31 includes one or more communication modules. For example, each communication module may include a module supporting mobile communication standards such as 4th generation (4G) and 5th generation (5G). The communication unit 31 may include a communication device such as a data communication module (DCM). The onboard device 11 is connected to the network 13 via the communication unit 31 and performs data communication with the server 10. The communication module includes a Global Positioning System (GPS) receiver module. The onboard device 11 receives GPS signals via the communication unit 31.

The storage unit 32 includes one or more memories. Each memory included in the storage unit 32 may be, for example, a semiconductor memory, a magnetic memory, or an optical memory, but is not limited thereto. Each memory may serve as, for example, a main storage device, an auxiliary storage device, or a cache storage device. The storage unit 32 stores arbitrary information which is used for operation of the onboard device 11. For example, the storage unit 32 may store control processing programs and embedded software.

The detection unit 33 includes, for example, various sensors that detect a vehicle speed, a braking force of a brake, acceleration, a steering angle, a yaw rate, and a direction. The detection unit 33 supplies detection results from various sensors to the navigation unit 35 and the control unit 36 at predetermined intervals.

The imaging unit 34 realizes an imaging function of the onboard device 11. The imaging unit 34 includes one or more cameras that image scenes or subjects in front of the vehicle 14 in the travel direction, to the sides of the vehicle 14, and behind the vehicle 14. Each camera of the imaging unit 34 may be a monocular camera or a stereoscopic camera. The imaging unit 34 captures an image of a scene or a subject outside the vehicle, generates captured image data, and supplies the generated captured image data to the control unit 36.

The navigation unit 35 realizes the navigation function of the onboard device 11. The navigation unit 35 includes one or more processors that perform processes associated with route guidance. The navigation unit 35 acquires map information from the storage unit 32 and acquires a user's input information from the input and output unit 30. The navigation unit 35 acquires a current position (for example, latitude and longitude) of the vehicle 14 which is detected by the control unit 36 from the control unit 36. The navigation unit 35 presents information for route guidance to a user via the input and output unit 30 based on the user's input information, the current position, and the like.

The control unit 36 includes one or more processors. Each processor is a general-purpose processor or a dedicated processor specialized in a specific process, but is not limited thereto. For example, an electronic control unit (ECU) which is mounted in the vehicle 14 may function as the control unit 36. The control unit 36 comprehensively controls the operation of the onboard device 11. The control unit 36 also has a clocking function of acquiring a current time.

Figure 4A:
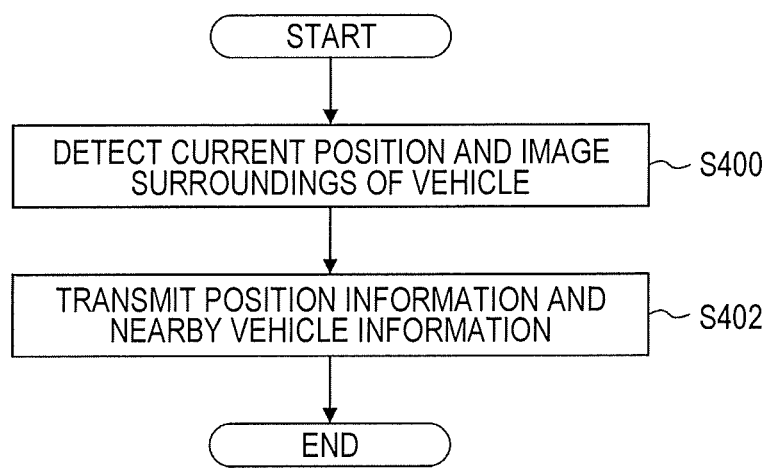
FIG. 4A is a flowchart illustrating an operation routine of the onboard device.
Figure 4B:
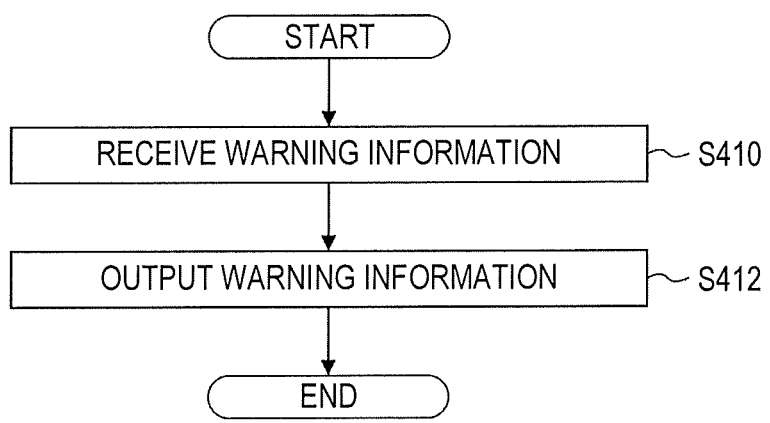
FIG. 4B is a flowchart illustrating an operation routine of the onboard device.
Figure 5:
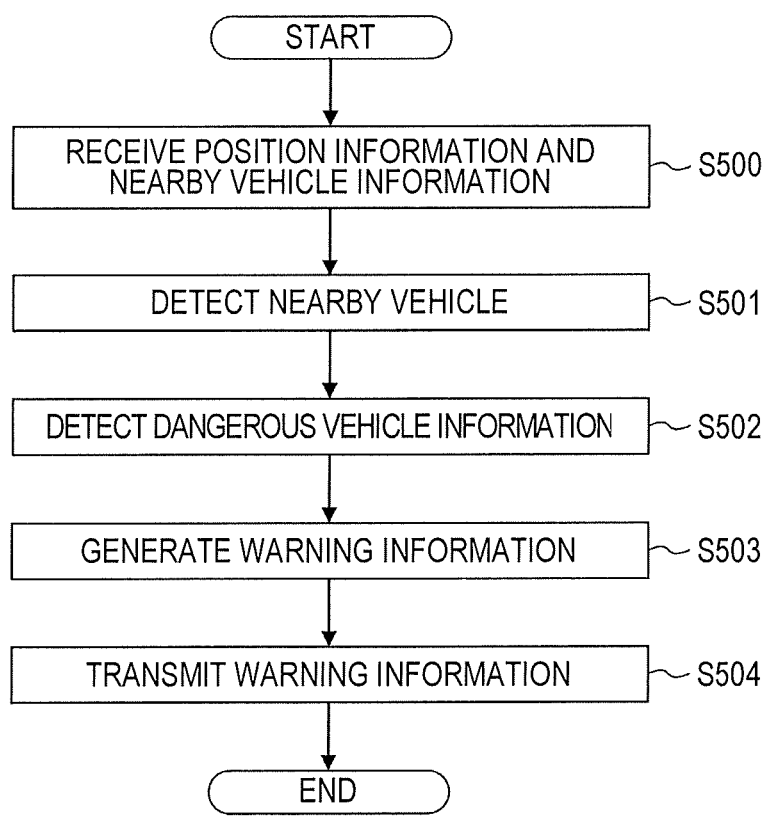
FIG. 5 is a flowchart illustrating an operation routine of the server 10.
Figure 6:
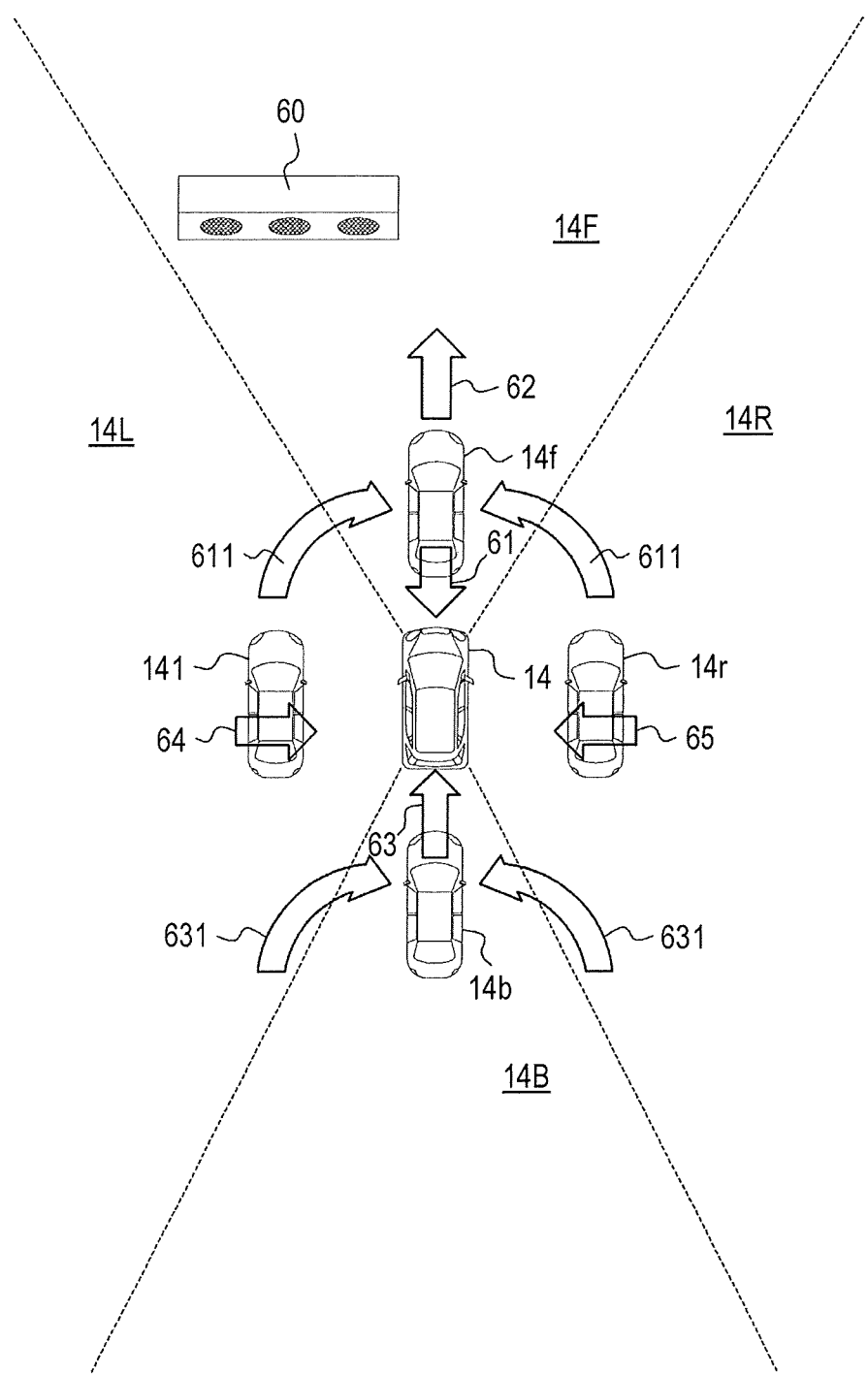
FIG. 6 is a diagram illustrating an example in which a dangerous vehicle is detected.
Figure 7:
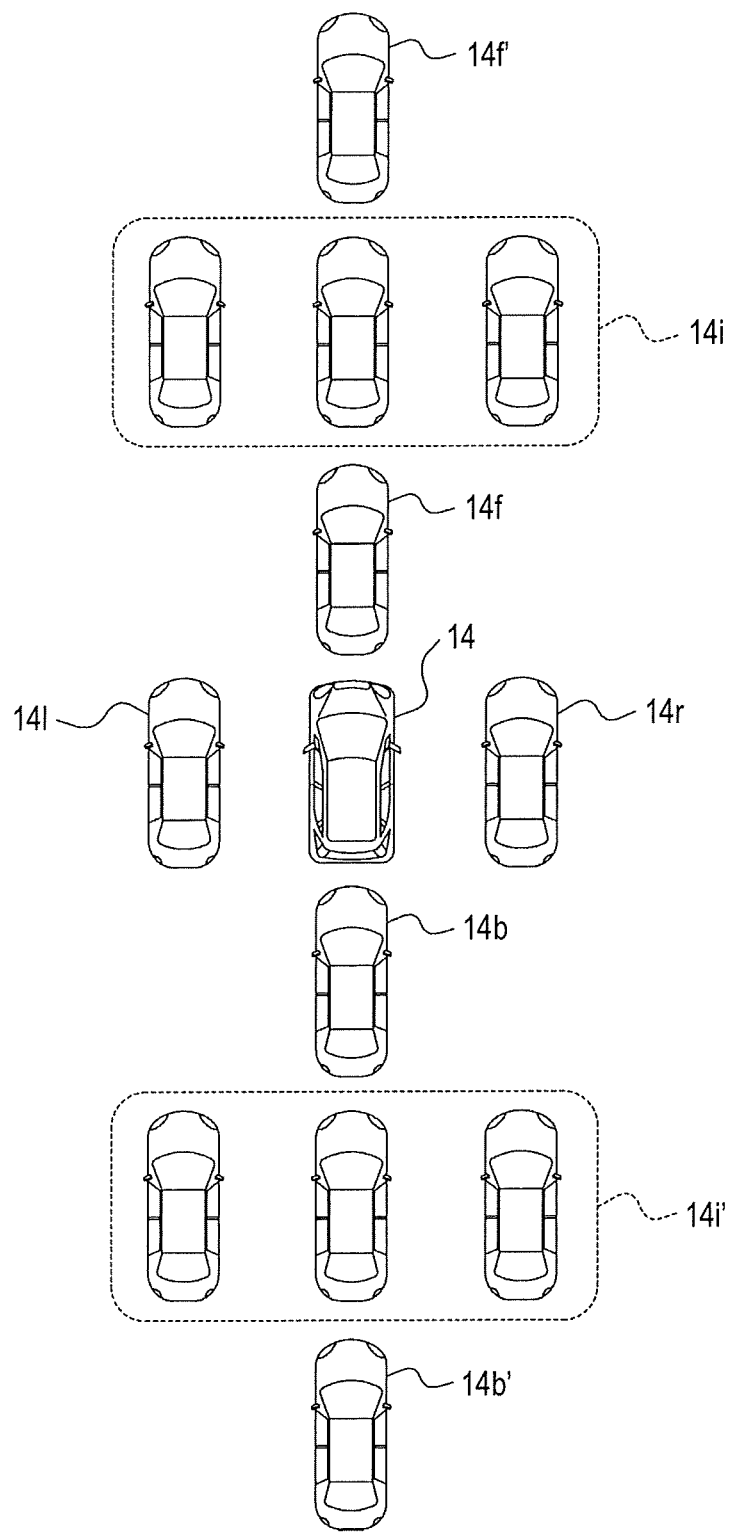
FIG. 7 is a diagram illustrating a destination of warning information.
Figure 8:
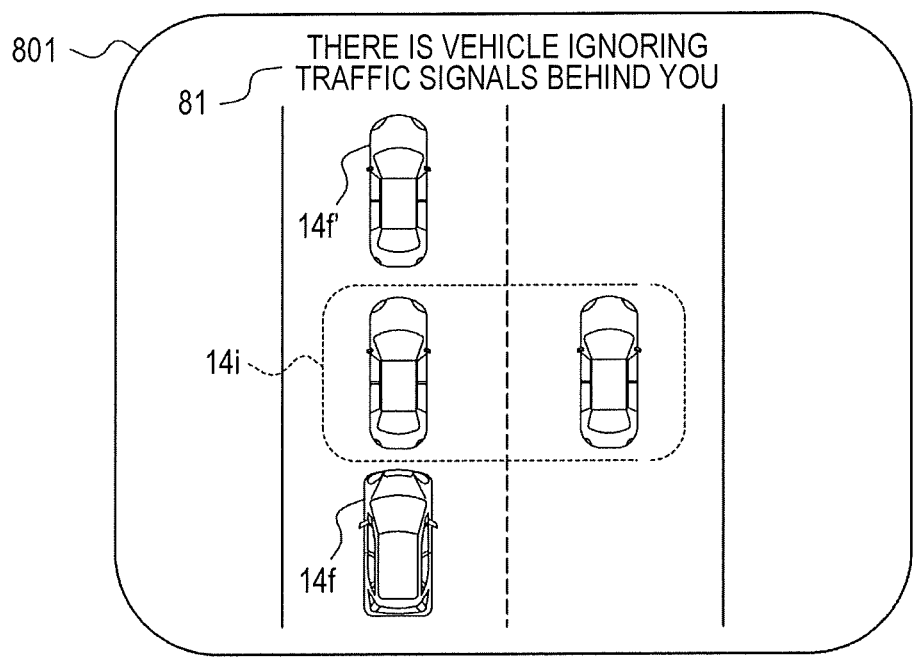
FIG. 8 is a diagram illustrating an example of warning information.
Figure 8:
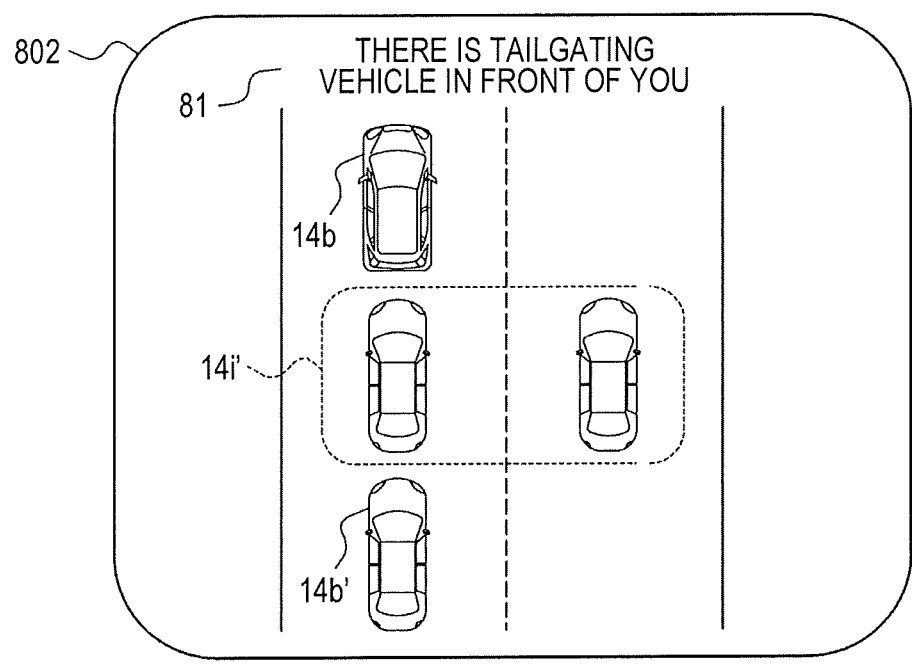

The operation of the information providing system 1 will be described below with reference to FIGS. 4A to 8. FIGS. 4A and 4B are flowcharts illustrating an operation routine of the onboard device 11. FIG. 5 is a flowchart illustrating an operation routine of the server 10. FIG. 6 illustrates an example in which dangerous behavior is detected. FIGS. 7 and 8 illustrate an example in which warning information is transmitted and displayed.

As illustrated in FIG. 4A, the onboard device 11 detects a current position of the vehicle 14 and images surroundings of the vehicle 14 (operation S400). Subsequently, the onboard device 11 transmits current position information and nearby vehicle information to the server 10 (operation S402). For example, the control unit 36 of the onboard device 11 performs operations S400 and 5402 at predetermined intervals (for example, several milliseconds to several seconds). For example, the control unit 36 acquires GPS signals from the communication unit 31 and detects the current position of the vehicle 14 from the GPS signals. The control unit 36 instructs the imaging unit 34 to capture an image, and the imaging unit 34 images the surroundings of the vehicle 14. At this time, nearby vehicles included in imaging areas are imaged. The control unit 36 acquires captured image data and an imaging time from the imaging unit 34. The nearby vehicle information includes the captured image data, the imaging time thereof, a direction of the captured image from the host vehicle (for example, forward, rearward, leftward, or rightward), and the current position of the host vehicle. The control unit 36 transmits the nearby vehicle information to the server 10 via the communication unit 31.

Subsequently, as illustrated in FIG. 5, the server 10 receives the position information and the nearby vehicle information (operation S500). The server 10 acquires position information and a plurality of pieces of nearby vehicle information which are temporally continuous for each onboard device 11, for example, by causing the onboard device 11 to perform operations S400 to S402 in FIG. 4A at predetermined intervals. Subsequently, the server 10 detects a nearby vehicle from the captured image data (operation S501). For example, the control unit 22 of the server 10 detects a nearby vehicle and a distance between the vehicle 14 and the nearby vehicle from the captured image data by edge recognition, image pattern recognition, and the like. The distance can be detected, for example, using a motion stereoscope method using continuous images with a monocular camera or a stereoscope method using parallax of stereoscopic cameras. The control unit 22 derives a moving direction and a moving speed of a nearby vehicle from captured images which are temporally continuous.

Subsequently, the server 10 detects dangerous vehicle information from the nearby vehicles (operation S502). The dangerous vehicle information includes a position of a dangerous vehicle exhibiting dangerous behavior and a type of the dangerous behavior. For example, the control unit 22 detects dangerous behavior corresponding to a combination of a moving direction and a moving speed of a nearby vehicle. For example, dangerous behavior patterns are stored in the storage unit 21, and the control unit 22 detects dangerous behavior of a nearby vehicle by pattern matching. Examples of dangerous behavior include shortening of a distance forward to a preceding vehicle, shortening of a distance rearward to a following vehicle, a provocative action (so-called tailgating) such as passing by a following vehicle, swerving of a parallel traveling vehicle, sudden cutting in to the front or back, ignoring a traffic signal, and meandering driving. The control unit 22 detects a nearby vehicle exhibiting such dangerous behavior as a dangerous vehicle. The control unit 22 detects a position of the dangerous vehicle from the current position of the host vehicle 14 and a direction and a distance of the dangerous vehicle relative to the host vehicle 14. The control unit 22 of the server 10 that performs operation S502 corresponds to a "dangerous vehicle detecting unit."

FIG. 6 is a diagram illustrating an example in which a dangerous vehicle is detected. FIG. 6 is a schematic bird's-eye view of a traveling vehicle 14 and nearby vehicles thereof. The onboard device 11 of the vehicle 14 images a preceding vehicle 14*f* in a front imaging area 14F in a traveling direction, a following vehicle 14*b* in a rear imaging area 14B, and parallel traveling vehicles 14*l* and 14*r* in a left imaging area 14L and a right imaging area 14R using the imaging units 34 corresponding to the imaging areas. FIG. 6 illustrates an example in which the preceding vehicle 14*f*, the following vehicle 14*b*, and the parallel traveling vehicles 14*l* and 14*r* are detected as dangerous vehicles.

In captured image data in the front imaging area 14F, for example, when the preceding vehicle 14*f* approaches the host vehicle 14 to be closer than a predetermined reference (an arrow 61), the control unit 22 detects shortening of the distance forward to the preceding vehicle 14*f*. At this time, for example, a condition that the host vehicle does not perform dangerous driving may be added to conditions for detecting dangerous behavior. Specifically, acceleration or a vehicle speed may be acquired from the vehicle 14 along with nearby vehicle information and a condition that the vehicle 14 does not accelerate more than a predetermined reference may be set as the condition. For example, a condition that the preceding vehicle 14*f* flickers a brake lamp more frequently than a predetermined reference frequency may be set as a condition for detecting dangerous behavior. When a front traffic signal 60 indicates caution or stop and the preceding vehicle 14*f* continues to travel (an arrow 62), the control unit 22 detects ignoring of a traffic signal by the preceding vehicle 14*f*. For example, when the preceding vehicle 14*f* moves laterally more frequently than a predetermined reference frequency, the control unit 22 detects meandering driving. By detecting such dangerous behavior, the control unit 22 detects the preceding vehicle 14*f* as a dangerous vehicle.

In captured image data in the rear imaging area 14B, for example, when the following vehicle 14*b* approaches the host vehicle 14 to be closer than a predetermined reference (an arrow 63), the control unit 22 detects shortening of the distance rearward to the following vehicle 14*b*. At this time, for example, a condition that the host vehicle does not perform dangerous driving may be added to conditions for detecting dangerous behavior. Specifically, acceleration or a vehicle speed may be acquired from the vehicle 14 along with nearby vehicle information and a condition that the vehicle 14 does not decelerate more than a predetermined reference may be set as the condition. For example, when the following vehicle 14*b* flickers a headlamp more frequently than a predetermined reference, the control unit 22 detects tailgating of the following vehicle 14*b*. For example, when the following vehicle 14*b* moves laterally more frequently and greatly than a predetermined reference, the control unit 22 detects meandering driving. By detecting such dangerous behavior, the control unit 22 detects the following vehicle 14*b* as a dangerous vehicle.

In captured image data in the left imaging area 14L, for example, when the parallel traveling vehicle 14*l* approaches the host vehicle 14 to be closer than a predetermined reference (an arrow 64), the control unit 22 detects swerving of the parallel traveling vehicle 14*l*. At this time, for example, a steering angle may be acquired from the vehicle 14 along with nearby vehicle information and a condition that the host vehicle 14 is not steered to the left more than a predetermined reference may be added to conditions for detecting dangerous behavior. Similarly, in captured image data in the right imaging area 14R, for example, when the parallel traveling vehicle 14*r* approaches the host vehicle 14 to be closer than a predetermined reference (an arrow 65), the control unit 22 detects swerving of the parallel traveling vehicle 14*r*. At this time, for example, a steering angle may be acquired from the vehicle 14 along with nearby vehicle information and a condition that the host vehicle 14 is not steered to the right more than a predetermined reference may be added to conditions for detecting dangerous behavior. By detecting such dangerous behavior, the control unit 22 detects the parallel traveling vehicles 14*l* and 14*r* as dangerous vehicles.

For example, when the vehicle 14*f* moves from the left imaging area 14L or the right imaging area 14R to the front imaging area 14F (an arrow 611) and approaches the host vehicle 14 to be closer than a predetermined reference, the control unit 22 detects cutting-in of the vehicle 14*f* to the front of the host vehicle 14. For example, when the vehicle 14*b* moves from the left imaging area 14L or the right imaging area 14R to the rear imaging area 14B (an arrow 631) and approaches the host vehicle 14 to be closer than a predetermined reference, the control unit 22 detects cutting-in of the vehicle 14*b* to the rear of the host vehicle 14. By detecting such dangerous behavior, the control unit 22 detects the preceding vehicle 14*f* or the following vehicle 14*b* as a dangerous vehicle.

The dangerous behavior is not limited to the examples illustrated in FIG. 6. The process of detecting a nearby vehicle and the process of detecting a dangerous vehicle are not limited to the above description and an arbitrary method such as machine learning may be employed.

Referring back to FIG. 5, the server 10 generates warning information for the onboard devices 11 of vehicles 14 near the dangerous vehicle from the dangerous vehicle information (operation S503) and transmits the generated warning information (operation S504). Since the onboard device 11 of each vehicle 14 transmits position information to the server 10 (operation S402 in FIG. 4A), the control unit 22 stores position information of the vehicles 14. The control unit 22 identifies the onboard device 11 which has transmitted position information corresponding to the surroundings (for example, several tens of meters) of the dangerous vehicle based on the positions of the vehicles. The control unit 22 generates warning information for the onboard device 11 based on a positional relationship between the vehicle 14 having the onboard device 11 mounted therein and the dangerous vehicle. The warning information includes the position of the dangerous vehicle, the type of the dangerous behavior, and a message corresponding to the type of the dangerous behavior. Then, the server 10 causes the communication unit 20 to transmit the warning information to the target vehicle 14. The control unit 22 of the server 10 that performs operation S503 in FIG. 5 corresponds to a "warning unit."

Subsequently, as illustrated in FIG. 4B, the onboard device 11 receives the warning information from the server 10 (operation S410) and outputs the received warning information (operation S412). For example, the control unit 36 of the onboard device 11 receives the warning information from the server 10 via the communication unit 31. Then, the control unit 36 outputs the warning information to a panel display of the input and output unit 30. The control unit 36 displays the type of the dangerous behavior or the position of the dangerous vehicle in addition thereto. The control unit 36 may display a warning message for calling attention. The routine illustrated in FIG. 4B is performed by the onboard device 11 which is mounted in the vehicle 14 different from the vehicle of the onboard device 11 performing the routine illustrated in FIG. 4A. Accordingly, it is possible to notify a driver of the presence of a dangerous vehicle based on an imaging result from the onboard device 11 of the different vehicle 14.

FIG. 7 is a diagram illustrating a destination of warning information. The dangerous vehicles (the preceding vehicle 14*f*, the following vehicle 14*b*, and the parallel traveling vehicles 14*l* and 14*r*) detected by the onboard devices 11 of the vehicles 14 and the vehicles near the dangerous vehicles which are illustrated in FIG. 6 are illustrated in the drawing. Here, an example in which other vehicles 14*i* are located in front of the preceding vehicle 14*f* of the vehicle 14 and a vehicle 14*f*' is located in front of the vehicles 14*i* is illustrated. An example in which other vehicles 14*i*' are located behind the following vehicle 14*b* of the vehicle 14 and a vehicle 14*b*' is located behind the vehicles 14*i*' is illustrated. In this case, there is concern that the vehicle 14*f*' and the vehicle 14*b*' cannot image the dangerous vehicle (14*f*, 14*b*, 14*l*, or 14*r*) due to the vehicles 14*i* and 14*i*'. A dangerous vehicle may not be detected in the imaging areas of the host vehicle. The dangerous vehicle may exhibit behavior that is dangerous to other vehicles including the vehicles 14f', 14i, and 14i' in addition to the vehicle 14. In this case, with the information providing system 1, the onboard device 11 of the vehicle 14 can notify the vehicles 14f' and 14b' and the vehicles 14i and 14i' of the presence of the dangerous vehicle 14f or the like and drivers or the like of the vehicle 14f' or the like may detect danger early.

FIG. 8 illustrates an example of warning information. A screen 801 which is displayed in the vehicle 14f' in FIG. 7 and a screen 802 which is displayed in the vehicle 14b' are illustrated. When displaying and outputting of the screen to a driver during driving may cause hindrance in safe driving, the onboard device 11 may display the screen on a display for another occupant.

In the vehicle 14f', for example, when warning information is received during route guidance by the navigation unit 35, the onboard device 11 displays and outputs the screen 801 using the input and output unit 30. For example, a vehicle 14i behind the vehicle 14f' and a dangerous vehicle 14f behind the vehicle 14i are displayed on the screen 801. A warning message 81 including a type of dangerous behavior such as "there is a vehicle ignoring traffic signals behind you" or "there is a tailgating vehicle in front of you" may be displayed. Alternatively, the warning message 81 may be output as speech.

For example, in the vehicle 14b', when warning information is received, the onboard device 11 displays and outputs the screen 802 via the input and output unit 30. For example, a vehicle 14i in front of the vehicle 14b' and a dangerous vehicle 14b in front of the vehicle 14i' are displayed on the screen 802. A warning message 81 such as "there is a tailgating vehicle in front of you" may be displayed. Alternatively, the warning message 81 may be output as speech.

According to the embodiment, the information providing system 1 can notify a driver of the vehicle 14 or the like that a dangerous vehicle is located nearby even when the dangerous vehicle cannot be directly imaged and recognized by the host vehicle. Accordingly, since a driver or the like can be alerted of a dangerous vehicle in advance, it is possible to contribute to safety.

In the above description, the onboard device 11 may detect dangerous vehicle information and transmit the dangerous vehicle information to the server 10 by performing operations S501 and S502 in FIG. 5. In this case, for example, the onboard device 11 performs operations S501 and S502 after operation S400 in FIG. 4A and transmits the dangerous vehicle information instead of the nearby vehicle information to the server 10. In this case, the control unit 36 of the onboard device 11 that performs operation S502 corresponds to a "dangerous vehicle detecting unit." Accordingly, it is possible to distribute a process load of the server 10.

While the disclosure has been described above in conjunction with all the drawings and embodiments, it should be noted by those skilled in the art that various modifications and changes can be easily made based on the present disclosure. Accordingly, it should be noted that such modifications and changes are included in the scope of the disclosure. For example, the functions included in the units or the operations can be rearranged as long as doing so does not result in logical inconsistency, and a plurality of units or operations may be combined into one unit or operation or may be divided. The programs causing the control unit 22 of the server 10 and the control unit 36 of the onboard device 11 to perform the operations in this embodiment are included in the scope of the disclosure.

The network 13 in this embodiment includes an ad hoc network, a local area network (LAN), a metropolitan area network (MAN), a cellular network, a wireless personal area network (WPAN), a public switched telephone network (PSTN), a terrestrial wireless network, an optical network, another network, or a combination of some thereof in addition to the above-mentioned examples. Examples of elements of a wireless network include an access point (for example, a Wi-Fi access point) and a femtocell. A wireless communication device can be connected to a wireless network using Bluetooth (registered trademark), Wi-Fi (registered trademark), cellular communication techniques, or other radio techniques and technical standards.

In this way, various aspects of the present disclosure can be embodied in many different embodiments and such embodiments are included in the scope of the present disclosure.

What is claimed is:

1. An information providing system comprising:
a server; and
an onboard device configured to transmit and receive information to and from the server,
wherein the onboard device includes an imager configured to image a nearby vehicle and a first transmitter configured to transmit nearby vehicle information including a captured image of the nearby vehicle or dangerous vehicle information including a position of a dangerous vehicle which is detected from the nearby vehicle information and position information of the onboard device to the server,
wherein the server includes a controller configured to generate warning information including the position of the dangerous vehicle for a vehicle near the dangerous vehicle and a second transmitter configured to transmit the warning information,
wherein the dangerous vehicle information further includes information regarding a type of dangerous vehicle behavior exhibited by the dangerous vehicle,
the dangerous vehicle behavior includes a behavior that potentially shortens a distance between the dangerous vehicle and the vehicle near the dangerous vehicle and a behavior that potentially causes contact between the dangerous vehicle and the vehicle near the dangerous vehicle,
the onboard device includes a dangerous vehicle detector configured to detect whether a host vehicle on which the onboard device is install is performing dangerous driving, and to detect the dangerous vehicle information of the dangerous vehicle from the nearby vehicle information, and
the dangerous vehicle detector is configured to detect the dangerous vehicle information in a case that the dangerous vehicle detector has determined that the host vehicle on which the onboard device is installed does not perform dangerous driving.

2. An onboard device comprising:
a receiver configured to receive the warning information according to claim 1; and
an output device configured to output the warning information.

3. The onboard device according to claim 2, wherein the warning information includes a warning message including a type of dangerous behavior.

4. A server comprising:
a receiver configured to receive nearby vehicle information including a captured image of a nearby vehicle which is captured by an onboard device and position information of the onboard device;

a dangerous vehicle detector configured to detect whether a host vehicle on which the onboard device is installed is performing dangerous driving, and to detect dangerous vehicle information of a dangerous vehicle from the nearby vehicle information;

a controller configured to generate warning information including a position of the dangerous vehicle for a vehicle near the dangerous vehicle; and a transmitter configured to transmit the warning information, wherein the dangerous vehicle information further includes information regarding a type of dangerous vehicle behavior exhibited by the dangerous vehicle, the dangerous vehicle behavior includes a behavior that potentially shortens a distance between the dangerous vehicle and the vehicle near the dangerous vehicle and a behavior that potentially causes contact between the dangerous vehicle and the vehicle near the dangerous vehicle, and the dangerous vehicle detector is configured to detect the dangerous vehicle information in a case that the dangerous vehicle detector has determined that the host vehicle on which the onboard device is installed does not perform dangerous driving.

5. A server comprising:

a receiver configured to receive dangerous vehicle information of a dangerous vehicle which is detected from nearby vehicle information including a captured image of a nearby vehicle which is captured by an onboard device and position information of the onboard device;

a controller configured to generate warning information including a position of the dangerous vehicle for a vehicle near the dangerous vehicle; and a transmitter configured to transmit the warning information, wherein the dangerous vehicle information further includes information regarding a type of dangerous vehicle behavior exhibited by the dangerous vehicle, the dangerous vehicle behavior includes a behavior that potentially shortens a distance between the dangerous vehicle and the vehicle near the dangerous vehicle and a behavior that potentially causes contact between the dangerous vehicle and the vehicle near the dangerous vehicle, the onboard device includes a dangerous vehicle detector configured to detect whether a host vehicle on which the onboard device is installed is performing dangerous driving, and to detect the dangerous vehicle information of the dangerous vehicle from the nearby vehicle information, and the dangerous vehicle detector is configured to detect the dangerous vehicle information in a case that the dangerous vehicle detector determines that the host vehicle on which the onboard device is installed does not perform dangerous driving.

6. An onboard device comprising:

a receiver configured to receive the warning information from the server according to claim 4; and an output device configured to output the warning information.

7. The onboard device according to claim 6, wherein the warning information includes a warning message including a type of dangerous behavior.

8. An onboard device comprising:

a receiver configured to receive the warning information from the server according to claim 5; and an output device configured to output the warning information.

9. The onboard device according to claim 8, wherein the warning information includes a warning message including a type of dangerous behavior.

10. An onboard device comprising:

an imager configured to image a nearby vehicle;

a dangerous vehicle detector configured to detect whether a host vehicle on which the onboard device is installed is performing dangerous driving, and to detect dangerous vehicle information of a dangerous vehicle from nearby vehicle information including a captured image of the nearby vehicle which is captured by the imager; and a transmitter configured to transmit the dangerous vehicle information and position information of the onboard device to a server, wherein the dangerous vehicle information further includes information regarding a type of dangerous vehicle behavior exhibited by the dangerous vehicle, and the dangerous vehicle behavior includes a behavior that potentially shortens a distance between the dangerous vehicle and the vehicle near the dangerous vehicle and a behavior that potentially causes contact between the dangerous vehicle and the vehicle near the dangerous vehicle, and the dangerous vehicle detector is configured to detect the dangerous vehicle information in a case that the dangerous vehicle detector determines that the host vehicle on which the onboard device is installed does not perform dangerous driving.

11. A non-transitory computer-readable storage medium, the non-transitory computer-readable storage medium being configured to store a computer program causing a computer to perform a method comprising:

receiving nearby vehicle information including a captured image of a nearby vehicle which is captured by an onboard device and position information of the onboard device;

detecting dangerous vehicle information of a dangerous vehicle from the nearby vehicle information;

generating warning information including a position of the dangerous vehicle for a vehicle near the dangerous vehicle; and transmitting the warning information, wherein the dangerous vehicle information further includes information regarding a type of dangerous vehicle behavior exhibited by the dangerous vehicle, the dangerous vehicle behavior includes a behavior that potentially shortens a distance between the dangerous vehicle and the vehicle near the dangerous vehicle and a behavior that potentially causes contact between the dangerous vehicle and the vehicle near the dangerous vehicle, the onboard device includes a dangerous vehicle detector configured to detect whether a host vehicle on which the onboard device is installed is performing dangerous driving, and to detect the dangerous vehicle information of the dangerous vehicle from the nearby vehicle information, and the dangerous vehicle detector is configured to detect the dangerous vehicle information in a case that the dangerous vehicle detector determines that the host vehicle on which the onboard device is installed does not perform dangerous driving.

12. A non-transitory computer-readable storage medium, the non-transitory computer-readable storage medium being configured to store a computer program causing a computer to perform a method comprising:
receiving dangerous vehicle information of a dangerous vehicle which is detected from nearby vehicle information including a captured image of a nearby vehicle which is captured by an onboard device and position information of the onboard device;
generating warning information including a position of the dangerous vehicle for a vehicle near the dangerous vehicle; and
transmitting the warning information,
wherein the dangerous vehicle information further includes information regarding a type of dangerous vehicle behavior exhibited by the dangerous vehicle, and
the dangerous vehicle behavior includes a behavior that potentially shortens a distance between the dangerous vehicle and the vehicle near the dangerous vehicle and a behavior that potentially causes contact between the dangerous vehicle and the vehicle near the dangerous vehicle,
the onboard device includes a dangerous vehicle detector configured to detect whether a host device on which the onboard device is installed is performing dangerous driving, and to detect the dangerous vehicle information of the dangerous vehicle from the nearby vehicle information, and
the dangerous vehicle detector is configured to detect the dangerous vehicle information in a case that the dangerous vehicle detector determines that the host vehicle on which the onboard device is installed does not perform dangerous driving.

13. An information providing method comprising:
causing an onboard device, which is configured to transmit and receive information to and from a server, to transmit nearby vehicle information acquired by imaging a nearby vehicle or dangerous vehicle information including a position of a dangerous vehicle which is detected from the nearby vehicle information and position information of the onboard device to the server;
causing the server to generate warning information including the position of the dangerous vehicle for a vehicle near the dangerous vehicle exhibiting dangerous behavior detected from the nearby vehicle information; and
causing the server to transmit the warning information,
wherein the dangerous vehicle information further includes information regarding a type of dangerous vehicle behavior exhibited by the dangerous vehicle,
the dangerous vehicle behavior includes a behavior that potentially shortens a distance between the dangerous vehicle and the vehicle near the dangerous vehicle and a behavior that potentially causes contact between the dangerous vehicle and the vehicle near the dangerous vehicle,
the onboard device includes a dangerous vehicle detector configured to detect whether a host vehicle on which the onboard device is installed is performing dangerous driving, and to detect the dangerous vehicle information of the dangerous vehicle from the nearby vehicle information, and
the dangerous vehicle detector is configured to detect the dangerous vehicle information in a case that the dangerous vehicle detector determines that the host vehicle on which the onboard device is installed does not perform dangerous driving.

14. The information providing system according to claim 1, wherein the dangerous vehicle detector detects the dangerous vehicle information using pre-stored patterns.

15. The information providing system according to claim 1, wherein the type of dangerous vehicle behavior includes swerving and tailgating.

* * * * *